July 10, 1962 A. MADSEN 3,043,908
FLUOROGRAPHIC SYSTEM FOR AERIAL SURVEY
Filed Sept. 8, 1959 2 Sheets-Sheet 1

INVENTOR
ANDREW MADSEN

BY Flehr & Swain
ATTORNEYS

July 10, 1962 A. MADSEN 3,043,908
FLUOROGRAPHIC SYSTEM FOR AERIAL SURVEY
Filed Sept. 8, 1959 2 Sheets-Sheet 2

INVENTOR
ANDREW MADSEN
BY Flehr & Swain
ATTORNEYS

United States Patent Office 3,043,908
Patented July 10, 1962

3,043,908
FLUOROGRAPHIC SYSTEM FOR AERIAL SURVEY
Andrew Madsen, San Lorenzo, Calif., assignor to Aircraft Engineering and Maintenance Co., Oakland, Calif., a corporation of California
Filed Sept. 8, 1959, Ser. No. 838,580
11 Claims. (Cl. 178—6.8)

This invention relates generally to a system for aerial survey, and more particularly to methods and means for such purpose making use of the fluorescence of certain materials when excited by radiant emissions in the ultraviolet range.

It is well known that technology is rapidly expanding the horizons of scientific aerial survey. The military, for example, have perfected many new techniques for aerial reconnaissance and employ photographic equipment of all kinds, as well as advanced instruments and techniques of electronics, magnetics, infrared and even ultrasonics and nucleonics. Aerial surveys have also been employed for the purpose of locating deposits of various substrata substances such as iron ore and uranium.

The present invention is directed to an extension of this field of technology, and has as its principal object the provision of system of aerial survey by which radiant emissions in the ultraviolet range can be employed to rapidly obtain valuable information concerning the earth's surface, for example, information concerning mineral deposits.

Another object of the invention is to provide a system of this character which is readily adapted to use in conventional aircraft.

Another object of the invention is to provide a method of fluorographic aerial survey making use of radiant emissions in the ultraviolet range.

Other objects and advantages of the invention will be apparent from the following description of exemplary embodiments, and from the drawings in which.

Figure 1:
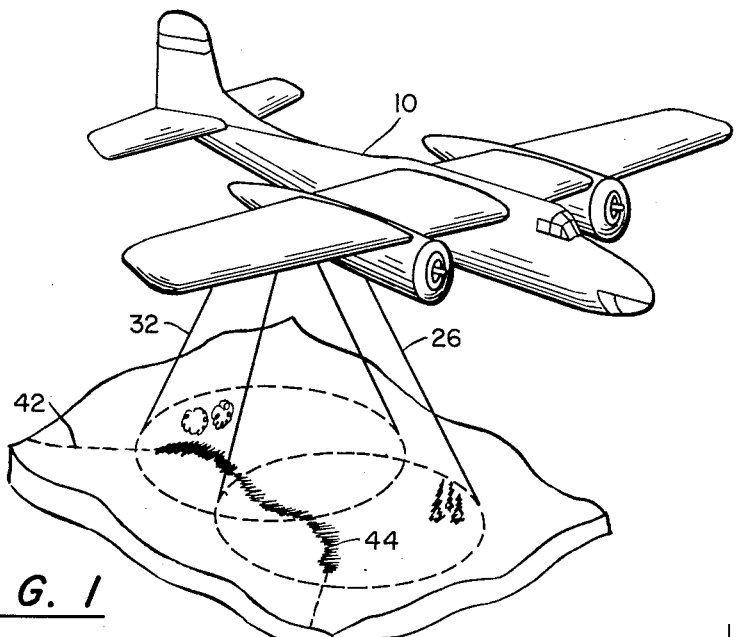
FIGURE 1 is a representational view in perspective illustrating the carrying out of an aerial survey in accordance with the invention.

Generally stated, the present invention relates to a system of fluorographic aerial survey employing ultraviolet radiation. The system essentially comprises an aircraft capable of emitting a controlled pulse of ultraviolet radiant energy to an appreciable area of the earth's surface, and at a level of energy distribution such that the radiated area will exhibit a pattern of fluorescence and associated phenomena. While ultraviolet radiation is rapidly absorbed in most forms of matter, the fluorescence of certain substances results in a luminescence which may be visually observed by personnel and equipment within the aircraft. This luminescence or fluorescence continues so long as the radiant stimulus producing it is maintained (ceasing about $10^{-8}$ seconds after the radiant excitation stops). In a preferred embodiment, therefore, it is desirable to provide means to record the pattern of fluorescence for viewing and study, for example a video camera equipped with an optical recorder or viewer.

A principal application of my fluorographic survey technique is in the detection of hydrocarbon compounds, such as petroleum deposits or petroleum by-products associated with a submerged source. Specifically, I have found that geological petroleum deposits undergo diverse conditions of diffusion and migration, through permeable faults, joints or minute fractures, principally adjacent the edges of a deposit, and eventually exercise an influence on vegetation and cover soil at the earth's surface. Such influence is detectable as a fluorescence when radiated with ultraviolet energy in the manner herein contemplated. In ocean areas, a similar influence is exerted at the surface of the sea by the propulsion systems of sea-going vessels so that the detection of such vessels, and particularly submerged vessels such as submarines, is made possible. In addition to hydrocarbon sources, it is contemplated that useful fluorographic information can be obtained with respect to a wide variety of other fluorescent substances on the earth's surfaces, such as various mineral deposits, etc., and that such information can be recorded from the airborne vantage point, and the information recorded or graphically presented.

In accordance with a specific embodiment of the present invention, an aircraft 10 is equipped with means to repetitively discharge huge pulses of radiant energy at a high level of energy distribution. Preferably such means comprise one or more condenser-discharge flash tubes 12, suitably connected to banks of storage condensers 14. The latter may be supplied with current from a suitable power source 16 (e.g. supplementary engine driven generators). A trigger circuit 18 is adapted to periodically discharge the stored energy to the flash tubes 12 in such manner that a large amount of the radiant emission is in the ultraviolet spectrum. As is well known, this spectral region encompasses the relatively shorter wave lengths of the radiation frequency scale, roughly from 4000 angstroms at the extremities of the violet to below 400 angstroms on the border of the X-ray regions. For the purposes of the present invention, ultraviolet radiation of the order of about 3000 to 4000 angstroms is to be preferred. To insure that the desired wave lengths are transmitted and the visible wave lengths absorbed, an ultraviolet filter (passing only those radiations below about 4000 angstroms—visual spectrum) can be employed.

Figure 3:
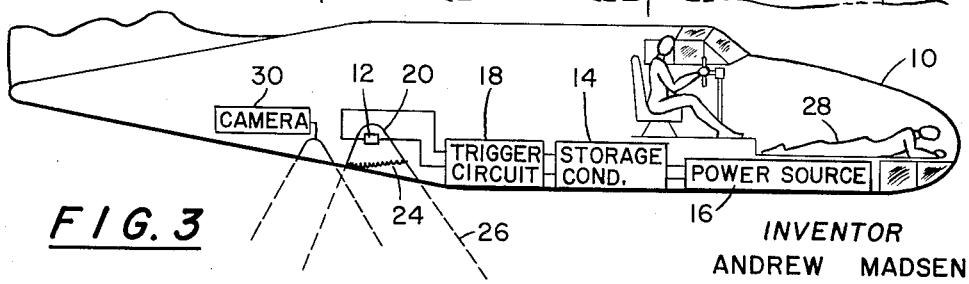
FIGURE 3 is a schematic view in section, illustrating a system of the invention, installed in an aircraft.

As illustrated in FIGURES 1 and 3, reflectors 20, suitably mounted in a lower portion of the aircraft, direct the radiant energy towards the surface of the earth in a beam approximately 60° in width. Preferably the beam pattern of radiation is canted forward at least 10° from the nadir, as indicated by the angle $\phi$ in FIGURE 3. This forward cant provides a desired spatial relationship to the observer, larger angles being generally impractical due to the gradient of radiation at the earth's surface.

As illustrative of a typical system, an aircraft 10 may be equipped with a power generating and converting source 16 of approximately 60 kilovolt amps., supplying current storage condensers 14. The latter can operate at approximately 4000 volts and have a storage capacity of 48,000 watt seconds (e.g. 3 banks at 16,000 watt seconds each). The trigger circuit 18 can function to discharge the stored energy practically instantaneously (in about 0.8 to 1.5 milliseconds) to three separate flash tubes 12. These tubes can be successively discharged (at about 65 millisecond intervals) to achieve a group of three separate pulses of radiant energy, with each group of three pulses occurring approximately 1500 milliseconds after a preceding group. The flash tubes 12 can be of the quartz condenser-discharge type (filled with xenon gas) and adapted to achieve a gas temperature of about 6600° Kelvin, to produce substantial radiant energy in the 3000 to 4000 angstrom area of the spectrum. This energy is filtered to prevent transmission of visible wave lengths, above about 400 angstroms. By distributing the energy into groups of three flashes, sufficient visual perception and persistence of retinal impression can be obtained to permit visual recordation of the resulting fluorescence by an observer 28, camera 30, or by other suitable means.

Assuming a video camera, the image obtained (represented at 32 in FIGURE 1) will be of the fluorescence produced by the radiation of the beam 26. Since the signal strength of this fluorescence is proportionately small, the video camera should similarly be provided with a filter to prevent reception of the primary radiation of the source 12. Such filter serves to prevent reflection of primary radiation from the terrain, or from the atmosphere, permitting maximum recordation of the fluorescence. An electronic light amplifier can also be advantageously employed, particularly where a low order of fluorescence is to be anticipated.

As indicated in FIGURE 1, it is contemplated that the aircraft will fly at a relatively low altitude above the earth's surface, say 1000 feet. As the radiated surface area is approximately equal to the square of the altitude of the aircraft, the radiation pattern at this altitude will encompass a very substantial area at each discharge of a flash tube 12. At an air speed of, say 180 knots, and at a flash interval of 1500 milliseconds, sufficient overlap of radiated areas will be achieved to insure that a continuous strip of substantial width is radiated. The energy distribution at the earth's surface will be in excess of 120 fluorens a square foot (fluorens being the designator for radiant energy in the 3000 to 4000 angstrom area), equivalent to lumens in the 4000 to 7000 angstrom visual area. Assuming a glow factor of the fluorescent substance in the range of 0.001%, this energy distribution will achieve a brightness of approximately 0.12 foot lamberts, or far above the threshold for photosensitive devices.

Successful operation of my system depends on the extremely high energy level achieved at each operation of the flash tubes (over 11,000,000 watts under the conditions stated), resulting in the radiation of an enormous pulse of energy to the earth's surface. The indicated energy level is of course due to the very rapid discharge of the energy accumulated by the condensers 14, which occurs in less than 1.5 milliseconds (optimum 1.2 milliseconds).

Figure 2:
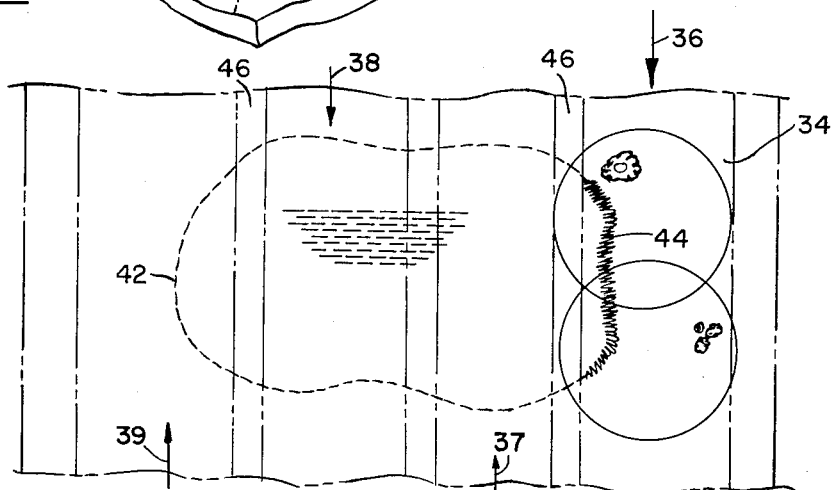
FIGURE 2 is a plan view showing a particular technique of carrying out such aerial survey.

Assuming conditions of darkness, the system of the invention is particularly adapted to a technique of terrestrial fluorogrammetry. Thus as indicated in FIGURE 2, a series of fluorographs may be taken while the plane is proceeding in a fixed direction, as indicated by the "strip" 34. When the area to be fluorographed is large, the flights may be made in opposite directions as indicated by the arrows 36 to 39. Adjacent strips should overlap, as at 46, to insure results which are satisfactory for practical use.

In the field of geochemical exploration, the technique just described permits the detection of a wide variety of hydrocarbon compounds. For example, the earth's surface is directly influenced by the presence of a petroleum field, and many surface indications such as oil seepages, hydrocarbon gases, bituminous outcrops, paraffine dirt, and other less obvious indications may be present. By taking advantage of the fluorescence of hydrocarbon compounds present in such surface influences, one employing the aerial survey system of the invention can "see" an entire petroleum deposit, as a hazy green-purple halo outlining the boundary of a deposit. This halo is represented at 42 in FIGURES 1 and 2, with the portion 44 representing actual fluorescence in response to the ultraviolet radiation.

Figure 4:
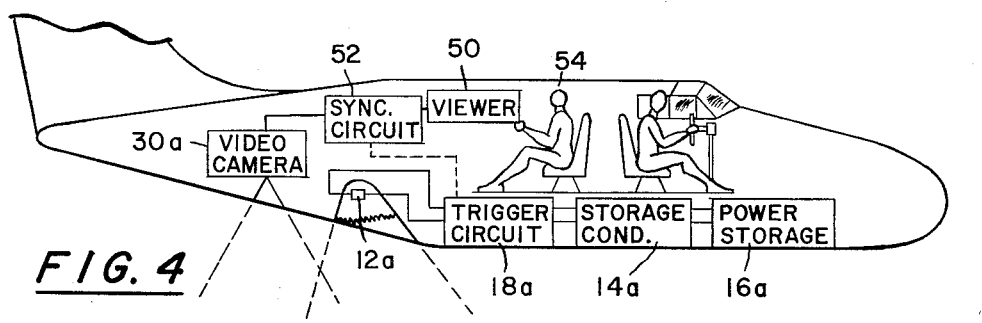
FIGURE 4 is a like view illustrating a slightly modified system.

In ocean areas, the system may be modified, for example as in FIGURE 4, to permit a continuous search or reconnaissance for the detection and tracking of submarines and other seagoing vessels. Such system may employ a closed video circuit and include a viewer 50 and a synchronizing circuit 52 adapted to time the operation of the video camera to the pulses of the flash tubes 12a. The synchronizing circuit 52 functions to time the operation of the video camera so that it scans the radiated area twice during the approximately 1.2 millisecond pulse of radiation of a tube 12. This scanning can be "remembered" or retained on the surface of the viewer 50 during the 1500 millisecond interval between the pulses.

The illustrated system permits the observer 54 to continuously monitor the viewing tube for any detectable fluorescence due to hydrocarbon particles or other fluorescent materials left in the wake of a submarine or other vessel. Installed in an aircraft moving at the speed of approximately 300 knots, this system is capable of surveying over 100 square nautical miles each hour, assuming operation at 2000 feet. In general, higher operational altitudes and speeds are possible in a sea reconnaissance, due to the relatively homogenous reflective characteristic of the sea.

Figure 5:
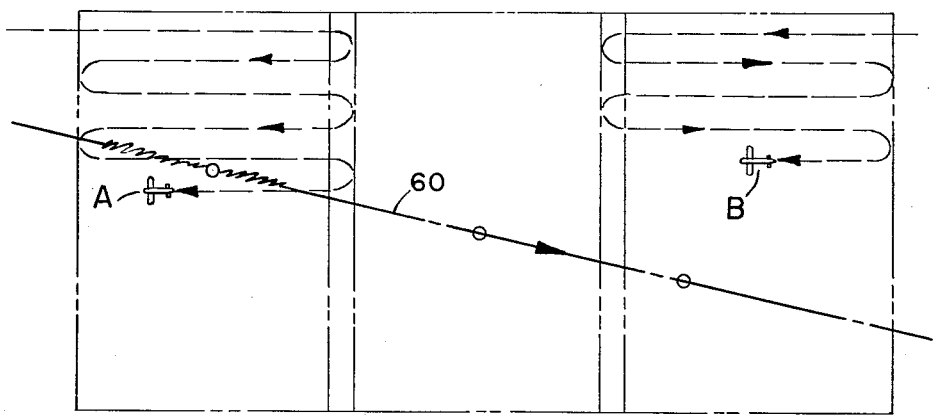
FIGURE 5 is a view like FIGURE 2, illustrating a technique for aerial survey adapted to more than one aircraft.

FIGURE 5 illustrates a possible air search technique employing the system of FIGURE 4, and carried out by two or more aircraft such as A and B. Assuming a detectable fluorographic wake evidence (represented by the line 60), an air search of this type can be expected to detect evidence of a moving submarine at distances of at least five nautical miles. In addition, information as to the direction of movement, time of passage, and similar tactical information can be obtained from the fluorographic patterns reported by the various search craft.

To those skilled in the art to which this invention relates, many changes in construction and widely differing embodiments and applications of the invention will suggest themselves without departing from the spirit and scope of the invention. Accordingly it should be understood that the disclosures and the description herein are purely illustrative and are not intended to be in any sense limiting.

I claim:

1. In a system for obtaining fluorographic information from the earth's surface, the combination with an aircraft of means for subjecting the earth's surface to ultraviolet radiant emissions of the order of 3000 to 4000 angstroms, said means including a flash tube capable of obtaining a temperature of the order of 6600° Kelvin, and circuit means to trigger the flash tube.

2. In a system for obtaining fluorographic information from the earth's surface, the combination with an aircraft of condenser-discharge means carried by the aircraft for subjecting the earth's surface to ultraviolet radiant emissions of the order of 3000 to 4000 angstroms, said means including a flash tube filled with xenon gas and circuit means including condensers adapted to repetitively trigger said flash tube to achieve a gas temperature of the order of 6600° Kelvin.

3. A system as in claim 2 wherein said flash tube is quartz.

4. A system as in claim 2 wherein said circuit means is adapted to trigger said flash tube at a repetitive rate at least as high as once every 1500 milliseconds.

5. A system as in claim 2 wherein said flash tube is provided with an ultraviolet filter preventing emission of radiations above about 4000 angstroms.

6. In a system for obtaining fluorographic information from the earth's surface, the combination with an aircraft of flash tube means carried by the aircraft for subjecting the earth's surface to ultraviolet radiant emissions of the order of about 3000 to 4000 angstroms, and means including a video camera for recording the pattern of fluorescence emanating from such surface as the result of the radiant emissions.

7. A system as in claim 6 wherein said recording means includes an electronic light amplifier.

8. In a system for fluorographic aerial survey, an aircraft, condenser-discharge means including a flash tube carried by said aircraft, said flash tube being filled with xenon gas, circuit means including condensers adapted to repetitively trigger the flash tube to achieve a gas temperature of the order of 6600° Kelvin, said trigger circuit being capable of functioning at least once every 1500 milliseconds, said condenser-discharge means being capable of periodically subjecting the earth's surface to ultraviolet radiant emissions of the order of about 3000 to 4000 angstroms, video camera means carried by said aircraft, and synchronizing circuit means causing said camera to periodically scan the surface being exposed to said radiant emissions, whereby the pattern of fluorescence emanated by the radiated surface can be periodically recorded.

9. A system as in claim 8 wherein the video camera scans the radiated surface at least twice during the period of fluorescence achieved by a radiant emission.

10. A system as in claim 8 wherein said video camera is associated with a viewer, said viewer being capable of retaining the image of fluorescence during the intervals between the periodic triggering of said flash tubes.

11. In a method for obtaining fluorographic information from the earth's surface, the steps of progressively subjecting relatively large areas of the earth's surface to ultraviolet radiant emissions of the order of 3000 to 4000 angstroms, said radiant emissions having an energy distribution at the surface of the earth of at least 120 fluorens a square foot, and thereafter visually recording the patterns of fluorescence emanating from the radiated surface.

References Cited in the file of this patent

UNITED STATES PATENTS

| | | |
|---|---|---|
| 2,237,193 | Mosby | Apr. 1, 1941 |
| 2,395,099 | Cage | Feb. 19, 1946 |
| 2,756,361 | Germeshausen | July 24, 1956 |